United States Patent
Sinapi et al.

(10) Patent No.: US 12,030,806 B2
(45) Date of Patent: Jul. 9, 2024

(54) COVER GLASS SHEET

(71) Applicant: AGC GLASS EUROPE, Louvain-la-Neuve (BE)

(72) Inventors: Fabrice Sinapi, Spy (BE); Etienne Degand, Wezembeek-Oppem (BE); Ingrid Marenne, Forville (BE); Zakaria Habibi, Braine l'Alleud (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 712 days.

(21) Appl. No.: 17/265,900

(22) PCT Filed: Aug. 7, 2019

(86) PCT No.: PCT/EP2019/071224
§ 371 (c)(1),
(2) Date: Feb. 4, 2021

(87) PCT Pub. No.: WO2020/030695
PCT Pub. Date: Feb. 13, 2020

(65) Prior Publication Data
US 2021/0163344 A1    Jun. 3, 2021

(30) Foreign Application Priority Data

Aug. 8, 2018 (EP) .................... 18188004

(51) Int. Cl.
*C03C 15/00* (2006.01)
*G02B 5/02* (2006.01)

(52) U.S. Cl.
CPC ............ *C03C 15/00* (2013.01); *G02B 5/0221* (2013.01); *G02B 5/0268* (2013.01); *G02B 5/0278* (2013.01); *G02B 5/0294* (2013.01)

(58) Field of Classification Search
CPC .... C03C 15/00; G02B 5/0221; G02B 5/0268; G02B 5/0278; G02B 5/0294; G02B 5/02; G02B 5/0205; G02B 5/021; G02B 5/0215
See application file for complete search history.

(56) References Cited

U.S. PATENT DOCUMENTS

2016/0236974 A1    8/2016  Sinapi et al.
2016/0280584 A1*   9/2016  Sinapi ................. G02B 5/0294

FOREIGN PATENT DOCUMENTS

WO    WO 2014/012809 A1    1/2014
WO    WO 2016/005216 A1    1/2016

OTHER PUBLICATIONS

International Search Report dated Oct. 16, 2019 in PCT/EP2019/071224, 3 pages.

(Continued)

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

A cover glass sheet configured to cover a display element including a first textured surface having a surface roughness defined by a first arithmetic amplitude value, Ra1, and a first spacing value, Rsm1. Both values are measured on an evaluation length of 12 mm with a Gaussian filter wherein the cut-off wavelength is 0.8 mm. A first transmission haze value, Haze1, is equal to or lower than 10%. A first clarity value, Clarity1, and a second textured surface comprise a second transmission haze value, Haze2. The second transmission haze value, Haze2, of the second textured surface is equal to or lower than a maximum haze value, HazeMax (Haze2≤HazeMax), wherein HazeMax=4.99–8.13 $10^{-1}$ (Haze1)+4.67 $10^{-2}$(Clarity1) %.

17 Claims, 2 Drawing Sheets

(56) References Cited

OTHER PUBLICATIONS

Figure 1:
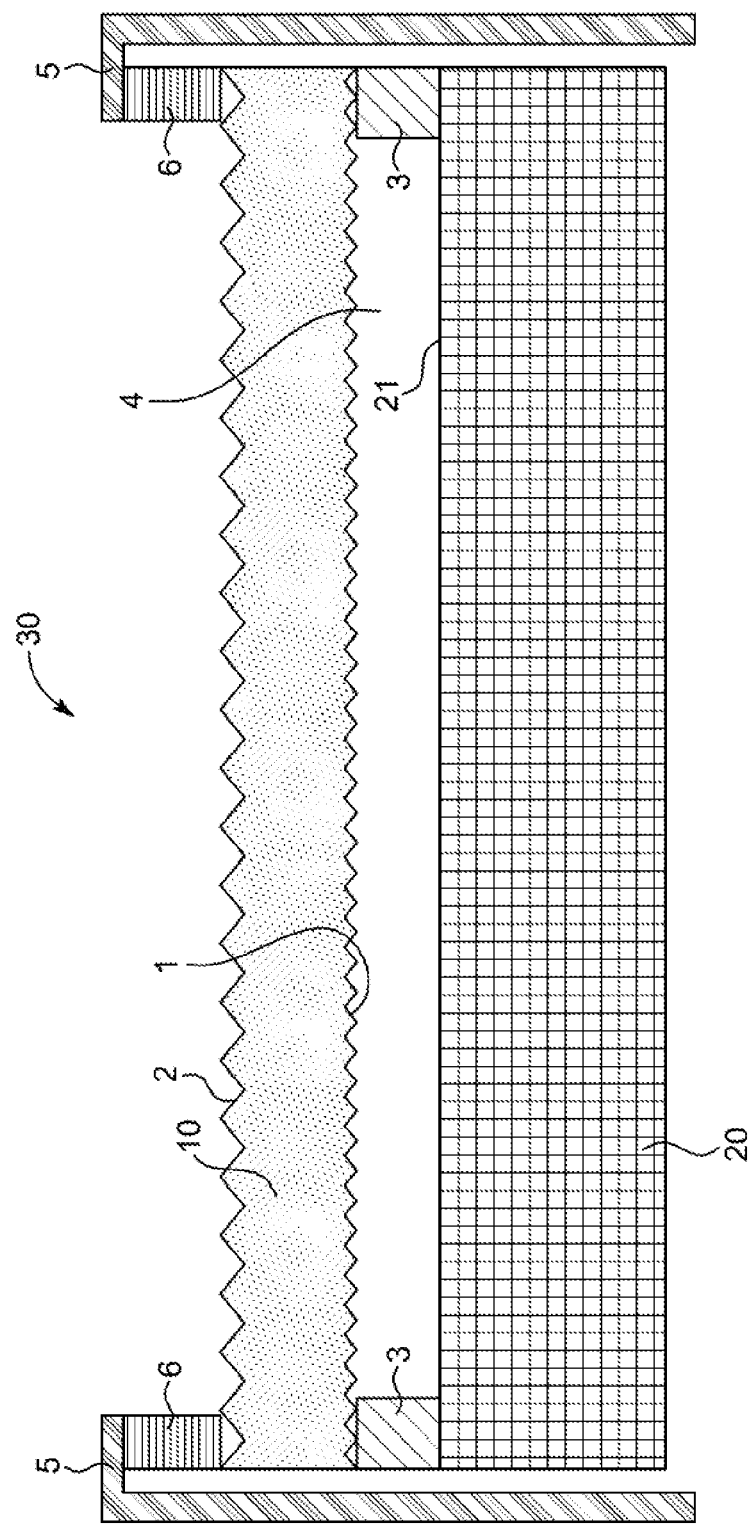
Figure 2:
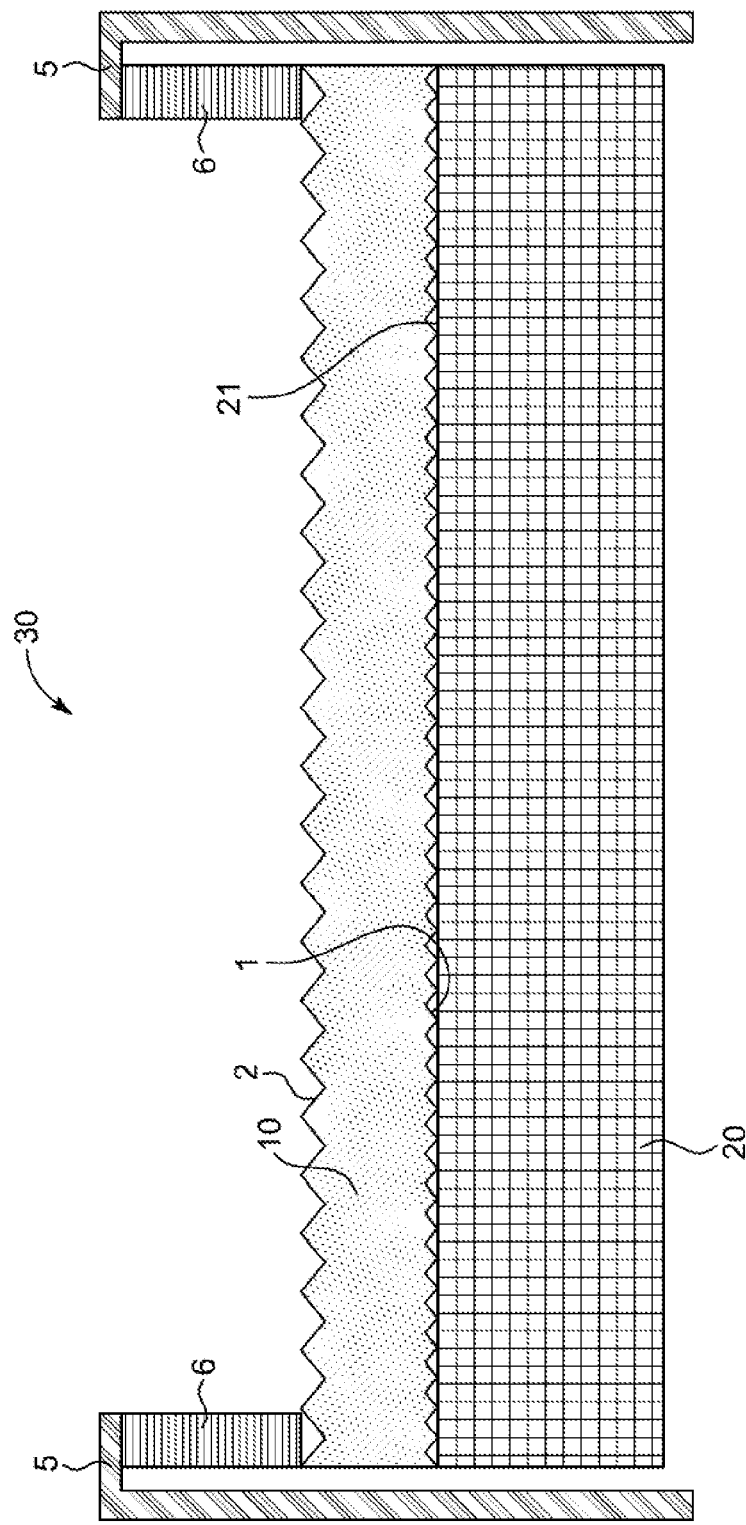

AGC Glass Unlimited: "Anti-Glare Acid Etched Glass For Display Application", Jan. 31, 2018, XP002787757, Retrieved from the Internet: URL:https://www.agc-yourglass.com/sites/default/files/agc_docs/G7600900C%20DatasheetAntiGlare_210x297 EN3.pdf [retrieved on Jan. 9, 2019].

* cited by examiner

COVER GLASS SHEET

1. FIELD OF THE INVENTION

The present invention relates to a cover glass sheet for display applications, which shows excellent anti-newton ring properties and having globally a low haze.

2. BACKGROUND ART

Touch display applications and digital signal applications typically comprise a display element separated from a cover glass sheet by an air gap. This air gap usually helps in preventing the cover glass sheet to touch the display element and to improve ventilation.

In recent years, displays devices have increased in size. Current average sizes are about 65 inches and it is expected that future average sizes for displays will reach 75 inches and even more. Furthermore, there is a request in the market place to decrease the overall weight of the display device. One element thereof is the thickness of the cover glass sheet that should be kept as minimal as possible.

Increasing the size of the cover glass sheet raises the technical issue of providing cover glass sheets of higher flexibility. Indeed, for similar finger pressures, the glass flexion in the center of the cover glass sheet is proportional to the square of the length of the glass. Maintaining a minimal thickness of the cover glass sheet contributes as well to the glass flexibility. Therefore, the chances of such cover glass sheets to touch the display element does increase substantially. First of all, the friction between the cover glass sheet and the display element mechanically damages the surface of the display element. Secondly, when the cover glass sheets comes into contact with the display element when the cover glass sheet is pressed by the finger of the user, Newton's rings are caused around the contact part.

US2013/0008767 addresses the technical problem of Newton's rings and the glare phenomenon called sparkles in touch panel applications and provides an anti-newton ring sheet having an uneven layer substantially formed with a polymer resin by arranging a plurality of structures with peaks in a lattice-like formation.

US2016/0221315 addresses the technical issue of resistance to blocking, resistance to Newton's ring and obtaining clear images by providing a laminate film for touch panel devices. US2016/0221315 teaches to use a laminate comprising a substrate, a refractive index adjusting layer on the first surface of the substrate; a transparent conductive layer on the opposite surface, and a fine concavo-convex structure layer having an average interval between convexities of 400 nm or less on the second surface.

JP2012252038 discloses an optical film that can improve anti-glare property or anti-Newton ring property, and can display a sharp image without whitening. Such optical film comprises a transparent film and a hard coat layer formed on the transparent film, in which an uneven structure having an average interval Sm between apexes of protrusions ranging from 600 to 1500 µm and an arithmetic average roughness Ra of 0.04 to 0.2 µm is formed on the surface of the hard coat layer. The hard coat layer is formed by curing a composition comprising a curable resin precursor and cellulose nanofiber of specific diameter and length.

However, none of these art addresses the technical problem of providing a cover glass sheet which provides anti-newton rings properties while maintaining low haze properties for the sheet as a whole (in particular, haze<10%).

3. SUMMARY OF THE INVENTION

The present invention relates to a cover glass sheet configured to cover a display element, having:
(i) a first textured surface having a surface roughness defined by a first arithmetic amplitude value, $Ra1$, being equal to or greater than 0.12 µm ($Ra1 \geq 0.12$ µm) and a first spacing value, $Rsm1$, being equal to or greater than 45 µm ($Rsm1 \geq 45$ µm) both measured on an evaluation length of 12 mm and with a Gaussian filter of which the cut-off wavelength is 0.8 mm, and having a first transmission haze value, $Haze1$, equal to or lower than 10% ($Haze1 \leq 10\%$), and a first clarity value, $Clarity1$; and
(ii) a second textured surface.

The second textured surface of the cover glass sheet of the present invention has a second transmission haze value, $Haze2$, equal to or lower than a maximum haze value, $HazeMax$ ($Haze2 \leq HazeMax$). $HazeMax$ is calculated via Equation (A):

$$HazeMax = 4.99 - 8.13 \cdot 10^{-1}(Haze1) + 4.67 \cdot 10^{-2}(Clarity1)\%  \quad \text{Equation (A)}$$

Such a condition allows to provide a total haze value lower than 10%.

The present invention further relates to a display device comprising a display element and the cover glass sheet of the present invention, configured so that the first textured surface of the cover glass sheet is facing the display element.

The present invention also relates to a method of production of the cover glass sheet of the present invention, comprising the steps of:
(i) Texturing the first surface to obtain a first arithmetic amplitude value, $Ra1$, being equal to or greater than 0.12 µm ($Ra1 \geq 0.12$ µm) and a first spacing value, $Rsm1$, being equal to or greater than 45 µm ($Rsm1 \geq 45$ µm) both measured on an evaluation length of 12 mm and with a Gaussian filter of which the cut-off wavelength is 0.8 mm, and to obtain a transmission haze value, $Haze1$, equal to or lower than 10% ($Haze1 \leq 10\%$);
(ii) Measuring the transmission haze value of the first textured surface, $Haze1$, according to the ATSM D1003 standard test method;
(iii) Measuring the clarity value of the first textured surface, $Clarity1$, according to ASTM D1003;
(iv) Calculating the maximal haze value, $HazeMax$ as per equation (A);

$$HazeMax = 4.99 - 8.13 \cdot 10^{-1}(Haze1) + 4.67 \cdot 10^{-2}(Clarity1)\%  \quad \text{Equation (A)}$$

(v) Texturing the second surface to obtain a transmission haze value, $Haze2$, equal to or lower than the maximum haze value, $HazeMax$ ($Haze2 \leq HazeMax$).

Other aspects and advantages of the embodiments will become apparent from the following detailed description taken in conjunction with the accompanying drawings which illustrate, by way of example, the principles of the described embodiments.

4. BRIEF DESCRIPTION OF THE DRAWINGS

FIG. 1 shows a cross sectional view of display device comprising a device element and a cover glass sheet according to one embodiment of the present invention.

5. DETAILED DESCRIPTION OF THE INVENTION

It is an object of the present invention to provide a cover glass sheet to be used in display applications, providing anti-newton ring properties as well as a low haze, in particular when designed in large dimensions. It is also an object of the present invention to provide such a cover glass sheet with anti-glare properties.

The following optical properties of the glass sheet are usually taking into account when designing glass applications:

(a) the direct total light transmission (or specular light transmission);

(b) the diffuse light transmission, measured through (i) the "transmission haze" and (ii) the "clarity". Transmission haze, also referred herein as "haze", corresponds to the diffuse transmittance at wide angles scattering while the "clarity" corresponds to the diffuse transmittance at narrow angles scattering. Haze and clarity can be measured in accordance to ASTM standard D1003 with specific illuminant.

(c) the gloss characterizing, for example, the brightness or shine (also called "glare") of a surface, and more particularly corresponding to the specular reflectance of a surface relative to a standard (such as, for example, a certified black glass standard) in accordance with ASTM standard D523 at a specific angle, usually 60°, and it is expressed in SGU (standard gloss units).

When designing cover glass sheets for display applications, both haze and glare properties should indeed be considered to improve or optimize readability of the displayed image or set of characters.

Light passing through glass sheets can be affected by irregularities and the glass sheet surface roughness, causing light to scatter in different directions. The degree of light scattering depends on the size and number of irregularities present and of the surface roughness. Light scattering is responsible for transmission haze due to the loss of transmissive contrast. Diffusion mechanisms, reached by for example by texturing, negatively affect the light reflection. The standard test method ASTM D 1003-11 defines haze as that percentage of transmitted light that is scattered so that its direction deviates more than an angle of 2.5° from the direction of the incident beam.

Glare deals with outer sources of reflection off a surface, such as bright sunlight or high ambient lighting conditions. Anti-glare properties are measured by the gloss optical property. Anti-glare properties uses diffusion mechanisms such as texturing, to break up the reflected light off the surface.

Therefore, there is a compromise to be found between glare reduction and haze reduction of the surface since increasing texture/roughness of a glass surface generally leads to desired reduction of the glare but undesired increase in haze.

As illustrated in FIG. 1, the cover glass sheet (10) of the present invention can be used with a display element (20) to form a display device (30). The cover glass sheet is typically separated from the display element by a spacer (3) defining and air gap (4) and protected by a protective frame (5). In general, infrared touch sensors (6) are used and located between the cover glass sheet and the protective frame.

The cover glass sheet has a first surface (1) and a second surface (2). When used in combination of a display element, the first surface is facing the display element and therefore may also be referred to as the inner surface. The second surface is facing the exterior of the display device and may also be referred to as the outer surface. The second outer surface of the cover glass sheet is separated from the first inner surface by the thickness of the cover sheet.

For display applications, it is known to texture the inner and/or the outer surfaces of the cover glass sheet to provide specific properties. The inner surface of the cover glass sheet is typically textured to provide anti-newton ring properties. The outer surface of the cover glass sheet is generally textured to provide anti-glare properties and a specific gentle touch feeling.

The present invention is based on the surprising finding that the inner and outer surfaces of the cover glass sheet can be textured, each, in a specific and corresponding manner: the inner surface is textured to provide superior anti-Newton ring and the outer surface is correspondingly textured in a carefully selected manner to confer it anti-glare properties, while giving low haze properties to the cover glass sheet as a whole.

Texturing a glass surface will indeed modify its optical properties and determine the specific haze, clarity and gloss values. Texturing both surfaces of a glass sheet will determine the haze, clarity and gloss value of the glass sheet as a whole. Therefore, to achieve the appropriate compromise between the anti-Newton-ring and anti-glare properties, the texturing of both surfaces of the cover glass sheet of the present invention needs to be specifically balanced, while keeping low value of haze for the cover glass sheet as a whole. Texturing the inner surface of the cover glass sheet is first achieved to obtain superior anti-Newton-ring properties. The second, outer surface of the cover glass sheet is then carefully textured to achieve minimal total haze for the cover glass sheet, with good anti-glare properties, as required for display applications. The present invention is based on the surprising finding that the outer, second surface of the cover glass sheet should be carefully textured so that a minimal total haze is obtained, taking into account the haze and clarity properties of the already textured inner, first surface.

It is preferred for display applications that cover glass sheets provide a total transmission haze of less than 10%, preferably less than 8% and more preferably less than 5%. Therefore, the first transmission haze value of the first textured surface sheet is equal to or lower than 10% (Haze1≤10%), preferably equal to or lower than 8% (Haze1≤8%), more preferably equal to or lower than 5% (Haze1≤5%). The second transmission haze value of the second textured surface sheet is preferably equal to or lower than 8% (Haze2≤8%), more preferably equal to or lower than 5% (Haze2≤5%).

The present invention is based on the finding that the total transmission haze value (Haze total), i.e., the transmission haze value of the cover glass sheet textured on both surfaces, is not the arithmetic sum of the transmission value obtained by texturing the first surface of the cover glass sheet (Haze1) and the transmission haze value obtained by texturing the second surface of the cover glass sheet (Haze2). The present invention is based therefore on the surprising finding that there is a specific relationship between the haze value of the second surface and the haze and clarity values of the first surface that should be met in order to achieve such low total transmission haze (in particular lower than 10%). Indeed, the second, outer surface of the cover glass sheet should be textured so that to obtain a haze value, Haze2, taking into account the haze and clarity values of the first inner surface of the cover glass sheet as per the following relation: Haze 2 should be equal to or lower than a maximal haze value, HazeMax, being calculated by Equation (A):

$$HazeMax=4.99-8.13 \; 10^{-1}(Haze1)+4.67 \; 10^{-2}(Clarity1).$$

The present invention relates to a cover glass sheet configured to cover a display element, having a first surface facing a display element. The first face is textured to present a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) both measured on an evaluation length of 12 mm and with a Gaussian filter of which the cut-off wavelength is 0.8 mm so that a haze value, Haze1, lower than 10%, is obtained (Haze1≤10%).

In a preferred embodiment, the first arithmetic amplitude value, Ra1, is comprised in the range of 0.12 μm≤Ra1≤0.5 μm, preferably in the range of 0.12 μm≤Ra1≤0.25 μm, more preferably in the range of 0.15 μm≤Ra1≤0.25 μm. In a preferred embodiment, the first spacing value, Rsm1, is comprised in the range of 45 μm≤Rsm1≤200 μm, preferably in the range of 45 μm≤Rsm1≤100 μm, more preferably in the range of 50 μm≤Rsm1≤100 μm.

It has been found that such texturing provides a superior anti-Newton-ring property. Said inner textured surface is therefore characterised by a first transmission haze value, Haze1 and a first clarity value, Clarity1.

The second surface of the cover glass sheet of the present invention, when used in combination with a display element to form a display device, is facing the exterior of the display device. The second surface is further textured to provide a second transmission haze value, Haze2, equal to or lower than a maximum haze value, HazeMax (Haze2≤HazeMax) wherein:

$$HazeMax=4.99-8.13 \; 10^{-1}(Haze1)+4.67 \; 10^{-2}(Clarity1)\%$$ Equation (A)

Such a condition allows to provide a total haze value lower than 10%.

In a preferred embodiment, to provide a total haze value lower than 8%, the HazeMax value is calculated as per equation (B):

$$HazeMax=3.21-8.13 \; 10^{-1}(Haze1)+4.67 \; 10^{-2}(Clarity1)\%$$ Equation (B)

In a more preferred embodiment, to provide a total haze value lower than 5%, the HazeMax value is calculated as per equation (C):

$$HazeMax=0.54-8.13 \; 10^{-1}(Haze1)+4.67 \; 10^{-2}(Clarity1)\%$$ Equation (C)

The cover glass sheet of the present invention being carefully textured to obtain a haze value, Haze2 equal to or lower than the maximum haze value, HazeMax calculated as per Equation (A), preferably Equation (B), more preferably Equation (C) described above, provides surprisingly the adequate balance between anti-Newton-ring and anti-glare properties, while keeping haze at low values.

In a preferred embodiment, the second textured surface has a surface roughness having a second arithmetic amplitude value, Ra2, being equal to or greater than 0.08 μm (Ra2≥0.08 μm) and a second spacing value, Rsm2, being equal to or greater than 45 μm (Rsm2≥45 μm) both measured on an evaluation length of 12 mm and with a Gaussian filter of which the cut-off wavelength is 0.8 mm.

In a further preferred embodiment, the arithmetic amplitude value, Ra2, is comprised in the range of 0.08 μm≤Ra2≤0.5 μm, preferably in the range of 0.08 μm≤Ra2≤2.5 μm, more preferably in the range of 0.09 μm≤Ra2≤0.25 μm. In a further preferred embodiment, the second spacing value, Rsm2, is comprised in the range of 45 μm≤Rsm2≤200 μm, preferably in the range of 45 μm≤Rsm2≤100 μm, more preferably in the range of 50 μm≤Rsm2≤100 μm.

It has been found that the etching of the second surface of the glass cover with such arithmetic amplitude and spacing values, provides further superior anti-glare properties.

Haze and clarity measurements are performed according to ASTM standard D1003-11 "Standard Test Method for Haze and Luminous Transmittance of Transparent Plastics", dated November 2011, with illuminant A, as per procedure A achieved with a hazemeter. Please refer to paragraph 7 of such standard test method.

Haze1 and Clarity1 are the values obtained for the cover glass sheet when the first, inner surface is textured as per invention, to provide superior anti-Newton-ring properties. Such values can be measured according to the standard test method ATSM D1003.

Haze2 is the value obtained for the cover glass sheet when the second, outer surface is textured as per invention, to provide superior anti-haze and preferably anti-glare properties. The Haze1, Haze2 and Clarity1 values of a cover glass sheet textured on both surfaces, can be determined independently as per the following method. Two samples of the cover glass sheet (or one sample divided into two pieces) are required. On the first sample, the first surface is maintained and the second surface is polished until a smooth surface is obtained. On the second sample, the second surface is maintained and the first surface is polished until a smooth surface is obtained.

Such smooth surface can be achieved by polishing the surface until it presents an arithmetic amplitude value, Ra0, being equal to or lower than 0.2 nm (Ra0≤0.2 nm). Such low arithmetic value are measured via an Atomic Force Microscopy equipment such as the professional AFM equipment supplied by Bruker using tapping mode with a cantilever using the following parameters: T (thickness of cantilever) being equal to 3.75 μm; F.° (cantilever frequency) being 300 KHz; L (length of cantilever) being 125 μm; K (Spring constant of cantilever) being 40 N/m and W (width of cantilever) being 35 μm and using a tip of reference: RTESP—MPP-11100-10.

The total transmission haze value, Hazetot, is the value obtained for cover glass sheet when both the first and the second surfaces of the cover glass sheet are textured as per invention. Such values can be measured according to the standard test method ATSM D1003.

The present invention further relates to a method of production of a cover glass sheet, comprising the steps of:
  i. Texturing the first surface of the cover glass sheet to obtain a first arithmetic amplitude value, Ra1, being equal to or greater than 0.12 μm (Ra1≥0.12 μm) and a first spacing value, Rsm1, being equal to or greater than 50 μm (Rsm1≥50 μm) both measured on an evaluation length of 12 mm and with a Gaussian filter of which the cut-off wavelength is 0.8 mm, and a transmission haze value equal to or lower than 10% (Haze1≤10%);
  ii. Measuring the transmission haze value from the first textured surface, Haze1, according to ASTM D1003;
  iii. Measuring the clarity value from the first textured surface, Clarity1, according to ASTM D1003;
  iv. Calculating the maximal haze value, HazeMax via Equation (A):

$$HazeMax=4.99-8.13 \; 10^{-1}(Haze1)+4.67 \; 10^{-2}(Clarity1)\%$$ Equation (A)

v. Texturing the second surface of the cover glass sheet to obtain a Haze2 value equal to or lower than the maximum haze value, HazeMax (Haze2≤HazeMax).

In a preferred embodiment, the second surface of the cover glass sheet is textured to provide a Haze2 value equal to or lower than HazeMax wherein HazeMax is calculated as per equation (B):

$$\text{HazeMax}=3.21-8.13\ 10^{-1}(\text{Haze1})+4.67\ 10^{-2}(\text{Clarity1}) \quad \text{Equation (B)}$$

In a more preferred embodiment, the second surface of the cover glass sheet is textured to provide a Haze2 value equal to or lower than HazeMax wherein HazeMax is calculated as per equation (C):

$$\text{HazeMax}=0.54-8.13\ 10^{-1}(\text{Haze1})+4.67\ 10^{-2}(\text{Clarity1}) \quad \text{Equation (C)}$$

Texturing a glass surface is widely used in the display industry. Texturing can be produced by several known methods like (i) removal of material from the smooth glass surface by chemical-etching or sandblasting or (ii) the application on the smooth surface of a rough coating by, for example, spraying, polymer web-coating or dip-coating.

According to the invention, both surfaces of the cover glass sheet are textured. By "etched surface", it is meant a surface which has been attacked by a mechanical or chemical way, removing a certain amount of glass material and giving a specific surface texture/roughness. We talk about chemically-etched glass when material removal occurs by chemical reactions/attack (i.e. acid etching). We talk about mechanically-etched glass when material removal occurs by mechanical reactions/attack (i.e. sandblasting).

According to the invention, the textured surface may be textured advantageously over substantially the entire glass surface, i.e. over at least 90% of the glass surface.

The textured surface of a glass sheet is usually characterized by its surface texture or roughness, and in particular, by the Ra and Rsm values (expressed as microns) defined in the standard ISO 4287-1997. The texture/roughness is a consequence of the existence of surface irregularities/patterns. These irregularities consist of bumps called "peaks" and cavities called "valleys". On a section perpendicular to the textured surface, the peaks and valleys are distributed on either side of a "center line" (algebraic average) also called "mean line". In a profile and for a measurement along a fixed length (called "evaluation length"):

Ra (amplitude value) corresponds to the average difference of texture, meaning the arithmetic average of absolute values of differences between the peaks and valleys. Ra measure the distance between this average and the "line" and gives an indication of the height of the patterns on the textured surface;

Rsm (spacing value) is the average distance between two successive passages of the profile through the "mean line"; and this gives the average distance between the "peaks" and therefore the average value of the widths of the patterns.

The roughness values according to the invention may be measured with a profilometer using 2D profiles (according to ISO4287 standard). Alternatively, one can use the technique of 3D profilometry (according to ISO 25178 standard) but isolating a 2D profile which then gives access to the parameters defined in the ISO4287 standard.

According to the invention, the roughness values are measured with a Gaussian filter, which is a filter of long wavelengths, also called profile filter $\lambda c$. It is used for separating the components of roughness/texture from components of undulation of the profile.

The evaluation length, L, according to the invention is the length of the profile used to evaluate the roughness. Base length, l, is the part of the evaluation length used to identify irregularities characterizing the profile to assess. The evaluation length, L, is divided/cut into n base lengths, l, which depend on the profile irregularities. The base length, l, corresponds to the "cut-off" wavelength (or limit wavelength) of the Gaussian filter ($l=\lambda c$). Typically, the evaluation length is of at least five times the base length.

In roughness measurements, a short wavelength filter (profile filter $\lambda s$) is also commonly used to eliminate the effects of very short wavelengths which are background noise.

According to an advantageous embodiment of the invention, the second surface of the cover glass sheet has a gloss value at 60° of from 50 to 120 SGU. More preferably, the glass sheet has a gloss value at 60° of from 60 to 110 SGU.

The gloss characterizes the brightness or shine of a surface, and more particularly corresponding to the specular reflectance of a surface relative to a standard (such as, for example, a certified black glass standard). The gloss is measured in accordance with the ASTM standard D523-14 "Standard Test Method for Specular Gloss" dated May 4, 2017, at the specific angle of 60° and it is expressed in SGU (standard gloss units).

The present invention also relates to a display device comprising a display element and a cover glass sheet as described above, configured so that the first textured surface of the cover glass sheet is facing the display element.

The cover glass sheet is typically separated from the display element by a spacer defining and air gap and protected by a protective frame. In general, infrared touch sensors (6) are used and located between the cover glass sheet and the protective frame as depicted in FIG. 1.

The display element has a display surface which may be smooth, i.e. non-textured and therefore having a surface roughness defined by an arithmetic amplitude value, Ra0, being equal to or lower than 0.2 nm (Ra0≤0.2 nm). In another embodiment, the display element has a display surface which may be textured and therefore having a surface roughness defined by an arithmetic amplitude value, Rad and by a first spacing value, Rsmd.

In a preferred embodiment of the present invention, the display device will be configured so that the air gap between the cover glass sheet and the display element, is limited to its minimum and in a more preferred embodiment, the textured cover glass sheet of the present invention is in direct contact with the surface of the display element. Indeed, it has been surprisingly found that by texturing the inner surface of the glass sheet of the present invention such as to provide a surface roughness defined by a first arithmetic amplitude value, Ra1, being equal to or greater than 0.12 μm (Ra1≥0.12 μm) and a first spacing value, Rsm1, being equal to or greater than 45 μm (Rsm1≥45 μm) then such textured inner face of the cover glass sheet can be brought into direct contact to the surface of the display element without causing Newton rings, nor mechanically damaging the surface of the display element.

In a further preferred embodiment, the first textured surface of the cover glass sheet is in direct contact with the display surface (2J1) of the display element over at least a portion of a contact area of the first textured surface of the cover glass sheet. Preferably, the direct contact is such that an average distance over the contact area between the first textured surface of the cover glass sheet and the display surface, Day, is equal to or lower than the sum of the arithmetic amplitude value, Ra1 and the arithmetic amplitude value, Rad (Day<5 (Ra1+Rad)).

The glass cover sheet extends over a length, L, measured parallel to a longitudinal axis, X, and extends over a width, W, measured parallel to a transverse axis, Y, normal to X. In a preferred embodiment, said portion of the contact area is larger than or equal to 80%, preferably 90%, more preferably 100% and even more preferably 110%, of the surface of a projection of the glass cover sheet onto a plane parallel to X and Y.

The cover glass sheet according to the invention when configured to be used with a display device, wherein the first surface is textured as per invention, shows excellent anti-scratch properties and does not mechanically damage the display surface of the display element. In particular, it shows an excellent resistance to abrasion.

The cover glass sheet according to the invention is made of glass whose matrix composition is not particularly limited and may thus belongs to different categories. The glass may be a soda-lime-silicate glass, an alumino-silicate glass, an alkali-free glass, a boro-silicate glass, etc. Preferably, the glass sheet of the invention is made of a soda-lime glass or an alumino-silicate glass.

According to an embodiment of the invention, the glass sheet has a composition comprising, in a content expressed in percentages of the total weight of the glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In a preferred embodiment, the glass sheet has a composition comprising, in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-10% |
| MgO | 0-10% |
| $K_2O$ | 0-10% |
| BaO | 0-5%. |

In a more preferred embodiment, the glass sheet has a composition comprising, in a content expressed in percentages of the total weight of the glass:

| | |
|---|---|
| $SiO_2$ | 65-78% |
| $Al_2O_3$ | 0-6% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Such a soda-lime-type base glass composition has the advantages to be inexpensive even if it is less mechanically resistant as such.

Ideally, according to this last embodiment, the glass composition does not comprise $B_2O_3$ (meaning that it is not intentionally added, but could be present as undesired impurities in very low amounts).

In an alternative more preferred embodiment, the glass sheet has a composition comprising, in a content expressed in percentages of the total weight of the glass:

| | |
|---|---|
| $SiO_2$ | 55-70% |
| $Al_2O_3$ | 6-18% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Such an alumino-silicate-type base glass composition has the advantages to be more mechanically resistant but it is more expensive than soda-lime.

Ideally, according to this last embodiment, the glass composition does not comprise $B_2O_3$ (meaning that it is not intentionally added, but could be present as undesired impurities in very low amounts).

According to an advantageous embodiment of the invention, combinable with previous embodiments on base glass composition, the glass sheet has a composition comprising a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no distortion when white silk printing of some glass elements of smartphones). The minimum value makes it possible not to be excessively damaging to the cost of the glass as such, low iron values often require expensive, very pure, starting materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $Fe_2O_3$) content ranging from 0.002 to 0.015 wt %.

According to another embodiment of the invention, in combination with previous embodiments on $Fe_2O_3$ content, the glass has a composition comprising chromium in a content such as: $0.0001\% \le Cr_2O_3 \le 0.06\%$, expressed in percentages of the total weight of glass. Preferably, the glass has a composition comprising chromium in a content such as: $0.002\% \le Cr_2O_3 \le 0.06\%$. This chromium content allows getting a glass with a higher IR transmission and it is thus advantageous when using the glass sheet in a touch panel using optical IR touch technologies like, for example, the Planar Scatter Detection (PSD) or Frustrated Total Inner Reflection (FTIR) (or any other technology requiring high transmission of IR radiation) in order to detect the position of one or more objects (for example, a finger or a stylus) on a surface of the glass sheet.

The glass sheet of the invention may be a drawn glass sheet or a float glass sheet. According to an embodiment, the glass sheet of the invention is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 microns.

The glass sheet according to the invention may have a thickness of from 0.1 to 25 mm. Advantageously, the glass sheet according to the invention has preferably a thickness of from 0.1 to 6 mm. More preferably, for reasons of weight, the thickness of the cover glass sheet according to the invention is of from 0.1 to 2.1 mm.

The cover glass sheet according to the invention can advantageously be prestressed glass. By prestressed glass, it means a heat strengthened glass, a thermally toughened glass, or a chemically strengthened glass. Heat strengthened glass is heat treated using a method of controlled heating and cooling which places the glass surfaces under compression and the glass core under tension. This heat treatment method delivers a glass with a bending strength greater than annealed glass but less than thermally toughened safety glass.

Thermally toughened safety glass is heat treated using a method of controlled heating and cooling which puts the glass surface under compression and the glass core under tension. Such stresses cause the glass, when impacted, to break into small granular particles instead of splintering into jagged shards. The granular particles are less likely to injure occupants or damage objects.

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. Aluminosilicate-type glass compositions, such as for example those from the products range DragonTrail® from Asahi Glass Co. or those from the products range Gorilla® from Corning Inc., are also known to be very efficient for chemical tempering.

According to the applications, intended use and/or properties desired, various layer(s)/treatment(s) can be deposited/done on the cover glass sheet of the invention, on one or both faces of the cover glass sheet. In such a case, the total transmission haze Hazetot is considered for the glass sheet as a whole, including the layer(s)/treatment(s).

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another embodiment of the invention, the glass sheet is coated with at least one antireflection layer. Advantageously, according to this embodiment, the cover glass sheet is coated with said antireflection layer on the second textured surface. This embodiment is advantageous in the case of use of the cover glass sheet of the invention as front cover of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to still another embodiment, the glass sheet has at least one anti-fingerprint layer/treatment so as to reduce or prevent fingerprints from registering. Advantageously, according to this embodiment, the glass sheet has said anti-fingerprint layer/treatment on the second textured surface. Such a layer/treatment can be combined with a transparent and electrically conducting thin layer deposited on the opposite face. Such a layer/treatment can be combined with an antireflection layer deposited on the same face.

According to still another embodiment of the invention, the glass sheet has an antibacterial layer/treatment. Advantageously, according to this embodiment, the glass sheet has said antibacterial layer/treatment on the second textured surface. For example, such an antibacterial treatment could be a diffusion of silver ions in the bulk of the glass sheet close to the outer surface.

Embodiments of the invention will now be further described, by way of examples only, together with some comparative examples, not in accordance with the invention. The following examples are provided for illustrative purposes, and are not intended to limit the scope of this invention.

EXAMPLES

The cover glass sheets of the examples 1 to 5 were prepared by assembling together two commercially available single etched glass sheets, thereby reproducing cover glass sheets textured on both surfaces. Each single etched glass sheets is characterized in terms texture (Ra and Rsm) and in terms of optical properties (haze, clarity and gloss). The two single etched glass sheets are coupled via their smooth surface by a liquid index forming therefore a double textured cover glass sheet. The addition of liquid index having the same index of refraction as the soda lime glass, (Immersion Liquid Index from Cargill with refractive index 1.52) does not interfere in the measurement of the measurement of haze and clarity.

The total haze is measured on the double textured cover glass sheet by the standard test method ATSM D1003 with illuminant A. Note that the haze value measured via ATSM D1003 is globally the same whatever surface of the cover glass sheet is illuminated within the hazemeter. Gloss measurements were performed according to ASTM standard D523 at a specific angle of 60°, with a glossmeter—Micro-Tri Gloss from BYK. Surface roughness measurements were performed using a 3D optical profiler Leica Type DCM3D, using the "Leica map" software, on an evaluation length of 12 mm and with a Gaussian filter of which the cut-off wavelength is 0.8 mm. The sample is first cleaned with detergent and dry. It is then placed under the microscope and after conventional settings, the profile of a 2D acquisition is then initiated (the software applies a default cut-off wavelength λs of 2.5 microns).

The exemplified cover glass sheet of examples 1 to 5 are soda-lime compositions of the following composition, in weight percentages:

|  | VCLO | FALCON |
|---|---|---|
| SiO2 | 73.27% | 66.48% |
| Na$_2$O | 13.9% | 15.7% |
| CaO | 7.9% | 1.0% |

-continued

| | VCLO | FALCON |
|---|---|---|
| MgO | 4.5% | 9.6% |
| $K_2O$ | 0.07% | 1.1% |
| $Al_2O_3$ | 0.1% | 5.8% |
| SO3 | 0.2% | 0.3% |
| $TiO_2$ | 0.06% | 0.02% |

Comparative Example 1

The cover glass sheet of comparative example 1 was prepared by coupling a VRD VCLO 90 soda-lime etched glass as the first, inner surface of the cover glass sheet via the Immersion Liquid Index from Cargill with refractive index 1.52, to a VRD VCLO 60 soda-lime etched glass as the second, outer surface of the cover glass sheet. VRD VCLO 60 and VRD VCLO 90 are commercially available glass sheets from AGC Glass Europe. The value of HazeMax has been calculated with Equation (A).

| Example 1 | | | | | | | |
|---|---|---|---|---|---|---|---|
| | Ra1 (µm) | Rsm1 (µm) | Haze1 (%) | Cl 1 (%) | Ra2 (µm) | Rsm2 (µm) | Gloss2 (SGU) | Haze Total (%) |
| VRD VCLO 90 + 60 | 0.326 | 111 | 2.4 | 63.9 | 0.456 | 124 | 59.4 | 12.1 |
| HazeMax (%) via Equation A | | | 6.0 | | Haze2 (%) | | | 7.7 |

The cover glass sheet of example 1 falls outside the scope of the present invention since the value of Haze2 is 7.7% being greater than the required maximal haze value of 6.0%.

Comparative Example 2

The cover glass sheet of comparative example 2 was prepared by coupling two LTS VCLO 60 soda-lime etched glasses via the Immersion Liquid Index from Cargill with refractive index 1.52. LST VCLO 60 is a commercially available glass sheet from AGC Glass Europe. The value of HazeMax has been calculated with Equation (A).

| Comparative Example 2 | | | | | | | |
|---|---|---|---|---|---|---|---|
| | Ra1 (µm) | Rsm1 (µm) | Haze1 (%) | Cl 1 (%) | Ra2 (µm) | Rsm2 (µm) | Gloss2 (SGU) | Haze Total (%) |
| LST VCLO 60 + 60 | 0.230 | 49.1 | 8.19 | 51.6 | 0.230 | 49.1 | 58.7 | 18.2 |
| HazeMax (%) via Equation A | | | 0.7 | | Haze2 (%) | | | 8.2 |

The cover glass sheet of example 2 falls outside the scope of the present invention since the value of Haze2 is 8.2% being greater than the required maximal haze value of 0.7%.

Example 3

The cover glass sheet of example 3 was prepared by coupling two Falcon 80 soda-lime etched glasses via the Immersion Liquid Index from Cargill with refractive index 1.52. Falcon 80 is a commercially available glass sheet from AGC Glass Europe.

| Example 3 | | | | | | | |
|---|---|---|---|---|---|---|---|
| | Ra1 (µm) | Rsm1 (µm) | Haze1 (%) | Cl 1 (%) | Ra2 (µm) | Rsm2 (µm) | Gloss2 (SGU) | Haze Total (%) |
| Falcon 80 + 80 | 0.246 | 73.9 | 3.3 | 66.3 | 0.246 | 73.9 | 79.3 | 7.89 |
| HazeMax (%) via Equation (A) | | | 5.4 | | Haze2 (%) | | | 3.3 |
| HazeMax (%) via Equation (B) | | | 3.6 | | | | | |

The cover glass sheet of example 3 falls within the scope of the present invention since the value of Haze2 being 3.3% is lower than the maximal haze value of 5.4% calculated via equation (A) and is even lower than preferred maximal haze value of 3.6% calculated via equation (B).

Example 4

The cover glass sheet of example 4 was prepared by coupling two LTS VCLO 90 soda-lime etched glasses via the Immersion Liquid Index from Cargill with refractive index 1.52. LST VCLO 90 is a commercially available glass sheet from AGC Glass Europe.

| Example 4 | | | | | | | |
|---|---|---|---|---|---|---|---|
| | Ra1 (µm) | Rsm1 (µm) | Haze1 (%) | Cl 1 (%) | Ra2 (µm) | Rsm2 (µm) | Gloss2 (SGU) | Haze Total (%) |
| LST VCLO 90 + 90 | 0.233 | 94.5 | 2.5 | 66.6 | 0.233 | 94.5 | 89.0 | 6.1 |
| HazeMax (%) via Equation (A) | | | 6.0 | | Haze2 (%) | | | 2.5 |
| HazeMax (%) via Equation (B) | | | 4.2 | | | | | |

The cover glass sheet of example 4 falls within the scope of the present invention since the value of Haze2 being 2.5% is lower than the maximal haze value of 6.0% calculated via equation (A) and is even lower than preferred maximal haze value of 4.2% calculated via equation (B).

Example 5

The cover glass sheet of example 5 was prepared by coupling a VRD VCLO 110 soda-lime etched glass as the first, inner surface of the cover glass sheet via the Immersion Liquid Index from Cargill with refractive index 1.52, to a VRD VCLO 90 soda-lime etched glass as the second outer surface of the cover glass sheet. VRD VCLO 90 and VRD VCLO 110 are commercially available glass sheets from AGC Glass Europe.

| | Example 5 | | | | | | |
|---|---|---|---|---|---|---|---|
| | Ra1 (μm) | Rsm1 (μm) | Haze1 (%) | Cl 1 (%) | Ra2 (μm) | Rsm2 (μm) | Gloss2 (SGU) | Haze Total (%) |
| VRD VCLO 110 + 90 | 0.209 | 96.1 | 1.16 | 77.5 | 0.326 | 111 | 88.9 | 4.27 |
| HazeMax (%) via Equation A | | | 7.7 | | Haze2 (%) | | 2.4 | |
| HazeMax (%) via Equation B | | | 5.9 | | | | | |
| HazeMax (%) via equation C | | | 3.2 | | | | | |

The cover glass sheet of example 5 falls within the scope of the present invention since the value of Haze2 being 2.4% is lower than the maximal haze value of 7.7% calculated via equation (A), is lower than the preferred maximal haze value of 5.9% calculated via equation (B) and is even lower than the more preferred maximal haze value of 3.2% calculated via equation (C).

| Ref. # | Feature |
|---|---|
| 10 | Cover glass sheet |
| 20 | Display element |
| 30 | Display device |
| 1 | First surface of the cover glass sheet |
| 2 | Second surface of the cover glass sheet |
| 3 | Spacer |
| 4 | Air gap |
| 5 | Protective frame |
| 6 | Infrared touch sensor |

The invention claimed is:

1. A cover glass sheet configured to cover a display element, comprising:
   a first textured surface having a surface roughness defined by a first arithmetic amplitude value, Ra1, being between 0.12 μm and 0.5 μm (0.12 μm≤Ra1≤0.5 μm)
   a first spacing value, Rsm1, being between 45 μm and 200 μm (45 μm≤Rsm1<200 μm) wherein both values are measured on an evaluation length of 12 mm and with a Gaussian filter wherein the cut-off wavelength is 0.8 mm,
   a first transmission haze value, Haze1, equal to or lower than 10%, (Haze1≤10%), and
   a first clarity value, Clarity1, and a second textured surface having a second transmission haze value, Haze2;
   wherein the second transmission haze value, Haze2, is equal to or lower than a maximum haze value, HazeMax (Haze2≤HazeMax) wherein:

$$HazeMax_A = (4.99 - ((8.13 \times 10^{-1})(Haze1))) + ((4.67 \times 10^{-2})(Clarity1))\%$$ [Equation (A)].

2. The cover glass sheet according to claim 1, wherein the second textured surface has a surface roughness defined by a second arithmetic amplitude value, Ra2, being between 0.08 μm and 0.5 μm (0.08 μm≤Ra2≤0.5 μm) and a second spacing value, Rsm2, being between 45 μm and 200 μm (45 μm≤Rsm2<200 μm), both measured on an evaluation length of 12 mm and with a Gaussian filter wherein a cut-off wavelength is 0.8 mm.

3. The cover glass sheet according to claim 2, wherein the second arithmetic amplitude value, Ra2, is in the range of 0.09μ≤Ra2≤0.25 μm.

4. The cover glass sheet according to claim 2, wherein the second spacing value, Rsm2, is in the range of 50 μm≤Rsm2≤100 μm.

5. The cover glass sheet according to claim 1, wherein second textured surface has a gloss value at 60° in the range of 50 to 120 Standard Gloss Units (SGU).

6. The cover glass sheet according to claim 5, wherein the second textured surface has a gloss value at 60° in the range of 60 SGU to 110 SGU.

7. The cover glass sheet according to claim 1, wherein $$HazeMax_B = (3.21 - ((8.13 \times 10^{-1})(Haze1))) + ((4.67 \times 10^{-2})(Clarity1))\%$$ [Equation (B)].

8. The cover glass sheet according to claim 1, wherein the first transmission haze value of the first textured surface, Haze1, is equal to or lower than 8% (Haze1≤8%).

9. The cover glass sheet according to claim 8, wherein the first transmission haze value of the first textured surface, Haze1, is equal to or lower than 5% (Haze1≤5%).

10. The cover glass sheet according to claim 1, wherein the second transmission haze value of the second textured surface, Haze2, is equal to or lower than 8% (Haze2≤8%).

11. A display device comprising the display element and the cover glass sheet according to claim 1, wherein the first textured surface of the cover class sheet is facing the display element.

12. The display device according to claim 11, wherein the display element comprises a display surface (Dav) and wherein the first textured surface of the cover glass sheet is in direct contact with the display surface over at least a portion of the first textured surface of the cover glass sheet.

13. The display device according to claim 12, wherein the display surface has a surface roughness defined by an arithmetic amplitude value, Rad, and wherein the direct contact with the display surface (Dav) is such that an average distance, over the contact area between the first textured surface of the cover glass sheet and the display surface (Dav) is lower than or equal to the sum of the arithmetic amplitude value, Ra1, and the arithmetic amplitude value.

14. A method of production of the cover glass sheet according to claim 1, comprising:
   (i) Texturing the first surface to obtain the first arithmetic amplitude value, Ra1, being between 0.12 μm and 0.5 μm (0.12 μm≤Ra1≤0.5 μm) and the first spacing value, Rsm1, being between 45 μm and 200 μm (45 μm≤Rsm1≤200 μm) both measured on an evaluation length of 12 mm and with a Gaussian filter wherein the cut-off wavelength is 0.8 mm, and to obtain a transmission haze value, Haze1, equal to or lower than 10% (Haze1≤10%);
   (ii) Measuring the transmission haze value of the first textured surface, Haze1, according to the ATSM D1003 standard test method;
   (iii) Measuring the clarity value of the first textured surface, Clarity1, according to ASTM D1003;
   (iv) Calculating the maximal haze value, HazeMax as per Equation (A):

$$HazeMax_A = (4.99 - ((8.13 \times 10^{-1})(Haze1))) + ((4.67 \times 10^{-2})(Clarity1))\%$$ [Equation (A)]

(v) Texturing the second surface to obtain a transmission haze value, Haze2, equal to or lower than the maximum haze value, HazeMax (Haze2≤HazeMax).

15. The cover glass sheet according to claim 1, wherein the first arithmetic amplitude value, Ra1, is in the range of 0.15 μm≤Ra1≤0.25 μm.

16. The cover glass sheet according to claim 1 wherein the first spacing value, Rsm1, is in the range of 50 µm≤Rsm1≤100 µm.

17. A cover glass sheet configured to cover a display element, comprising:
- a first textured surface having a surface roughness defined by a first arithmetic amplitude value, Ra1,
- a first spacing value, Rsm1, wherein both values are measured on an evaluation length of 12 mm and with a Gaussian filter wherein the cut-off wavelength is 0.8 mm,
- a first transmission haze value, Haze1, equal to or lower than 10%, (Haze1≤10%), and
- a first clarity value, Clarity1, and a second textured surface having a second transmission haze value, Haze2;

wherein the second transmission haze value, Haze2, is equal to or lower than a maximum haze value, HazeMax (Haze2≤HazeMax) wherein:

$$HazeMax_B = (4.99 - ((8.13 \times 10^{-1})(Haze1))) + ((4.67 \times 10^{-2})(Clarity1))\% \quad \text{[Equation (A)]}.$$

* * * * *